A. F. MOREY.
PNEUMATIC TIRE.
APPLICATION FILED SEPT. 11, 1918.

1,382,216. Patented June 21, 1921.

INVENTOR
Amos F. Morey
BY
Edward A. Strauss
ATTORNEY.

UNITED STATES PATENT OFFICE.

AMOS F. MOREY, OF OKLAHOMA, OKLAHOMA.

PNEUMATIC TIRE.

1,382,216.  Specification of Letters Patent.  Patented June 21, 1921.

Application filed September 11, 1918. Serial No. 253,504.

*To all whom it may concern:*

Be it known that I, AMOS F. MOREY, a citizen of the United States, residing at Oklahoma city, in the county of Oklahoma and State of Oklahoma, have invented new and useful Improvements in Pneumatic Tires, of which the following is a specification.

This invention relates to a resilient tire for vehicle wheels.

It is the object of this invention to provide a pneumatic tire which will not totally collapse when punctured in one or more places.

Another object is to provide a pneumatic tire built up of a multiplicity of cell members, each cell member being fluid tight and individually inflated with fluid under a pretermined pressure.

A still further object of this invention is to provide a structure built up of cell members, whereby when one member has become punctured it may be readily removed and repaired or a new one substituted.

Another object is to provide a tire built up of individual cell members, which are so correlated that they will not become disorganized.

Other objects will appear by reference to the detailed description and accompanying drawings, in which.

Figure 1:
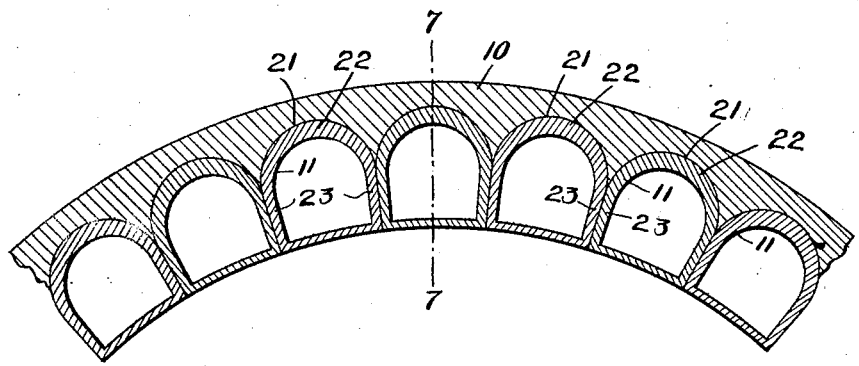
Figure 1 is an enlarged longitudinal section of a fragment of a tire embodying my invention.
Figure 2:
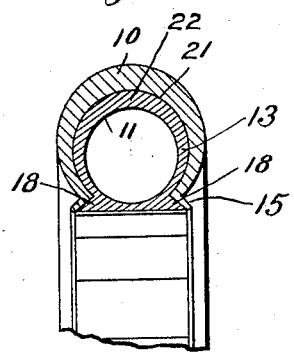
Fig. 2 is a transverse section of the same taken on line 7—7 of Fig. 1.
Figure 3:
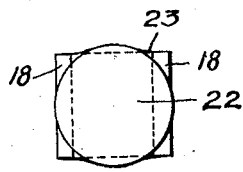
Fig. 3 is a detail plan view showing one of the cell members.

Referring more particularly to the drawings, 10 indicates an annular outer tire casing of fabricated material, such as is commonly used for casings of this character. Mounted within casing 10 is a plurality of hollow fluid-tight cell members composed of rubber or other elastic material, said cell members having a semispherical formation on the tread portions 22 and a wedge formation at their inwardly projecting portions 23. The inner peripheral surface of the tire casing is provided with a plurality of semispherical sockets 21 adapted to receive the semispherical portions 22 of the cell members 11, as clearly shown in Fig. 1 of the drawing. By means of this socket formation on the inside of the tire casing 11 and the semispherical portions 22 of the cell members it will be readily understood that the cell members will be held against displacement during the rotation of the tire when mounted on a vehicle wheel.

It will also be noted that as each cell member is individually held in the socket formed in the outer casing, the same will not become displaced should an adjacent cell member become punctured.

The walls 13 of the cell members are cylindrical in formation, being comparatively thin on the oppositely disposed sides and thick at the tread portion 22, and provided with oppositely disposed flanges 18 adapted to be engaged by the rim (not shown) of the wheel together with the flanges 15 formed on the outer casing.

It will be noted from the foregoing construction that in building up the tire preparatory to placement on the wheel rim, the cell members are first inflated with air at the desired pressure, the means for accomplishing this being immaterial as it forms no part of my invention. They are then inserted in the sockets 21 formed in the inner peripheral surface of the outer casing in a circular formation, the longitudinal radial walls of each cell member abutting against each other as clearly shown in Fig. 1 of the drawing, thereby locking each cell member in keyed relation with the other.

It is obvious from the foregoing construction that all the cells are firmly locked against displacement, the cell members being wedged together longitudinally and held in proper relation by the sockets formed in the outer casing.

The walls of the treads of the outer casing and the cell members are both comparatively thick in order to obviate the possibility of puncture, but should one of the cell members become punctured the whole tire is not affected and does not become flat as in the case of tires provided with a single tube. Thus a considerable amount of the utility of the tire is preserved even after it has received one or more punctures.

It will also be noted that a number of these inflated cells may be carried in the vehicle, and should a cell member become punctured it may readily be removed and another substituted therefor without employing the aid of a skilled mechanic.

What I claim is:

A tire construction, comprising a series of hollow members adapted to hold air under pressure and arranged in annular formation, the top portion of said members being of globular form and the bases of said members being of flat form, the side walls of said members contacting when arranged in tire form, whereby to prevent movement of the members when mounted on a vehicle wheel, and an outer casing completely enveloping the top and sides of said hollow members, the inner face of said casing being provided with a plurality of depressions adapted to register with and engage the globular top portions of said hollow members, whereby to prevent accidental displacement of said members when arranged in tire formation.

In witness that I claim the foregoing I have hereunto subscribed my name this second day of August, 1918.

AMOS F. MOREY.